(12) United States Patent
Park et al.

(10) Patent No.: US 7,415,838 B2
(45) Date of Patent: Aug. 26, 2008

(54) SECOND-REFRIGERANT PUMP DRIVING TYPE AIR CONDITIONER

(75) Inventors: Bong-Soo Park, Seoul (KR); Sai-Kee Oh, Anyang (KR); Chi-Woo Song, Incheon (KR); Ju-Won Kim, Changwon (KR); Baik-Young Chung, Incheon (KR); Se-Dong Chang, Gwangmyeong (KR); Jae-Heuk Choi, Seoul (KR)

(73) Assignee: LG Electronics Inc, Seoul (KR)

( * ) Notice: Subject to any disclaimer, the term of this patent is extended or adjusted under 35 U.S.C. 154(b) by 327 days.

(21) Appl. No.: 11/357,073

(22) Filed: Feb. 21, 2006

(65) Prior Publication Data

US 2006/0191286 A1 Aug. 31, 2006

(30) Foreign Application Priority Data

Feb. 26, 2005 (KR) .................. 10-2005-0016281
Feb. 26, 2005 (KR) .................. 10-2005-0016282

(51) Int. Cl.
*F25D 17/02* (2006.01)
(52) U.S. Cl. ...................... 62/434; 62/324.1
(58) Field of Classification Search ............ 62/330, 62/324.1, 430, 434
See application file for complete search history.

(56) References Cited

U.S. PATENT DOCUMENTS 2,893,218 A * 7/1959 Harnish ................ 62/180
5,607,013 A * 3/1997 Inoue et al. ............. 165/207
5,784,893 A * 7/1998 Furuhama et al. ......... 62/333
6,119,478 A   9/2000 Sada et al.
6,851,273 B2  2/2005 Jang et al.
2005/0081537 A1 4/2005 Hwang et al.

FOREIGN PATENT DOCUMENTS

JP      2004-177067    6/2004
KR        100360966    4/1999

OTHER PUBLICATIONS

English language Abstract of the corresponding Japanese Laid-Open Patent Publication No. HEI 10-197171.
English language Abstract of JP 2004-177067.

* cited by examiner

*Primary Examiner*—Melvin Jones
(74) *Attorney, Agent, or Firm*—Greenblum & Bernstein, P.L.C.

(57) ABSTRACT

A second-refrigerant pump driving type air conditioner, including an indoor unit having an indoor heat exchanger that circulates a refrigerant containing no oil, a first circulator including a compressor that compresses and discharges a refrigerant containing oil, a first outdoor heat exchanger, a second outdoor heat exchanger, and an outdoor expander, and a second circulator including an intermediate heat exchanger connected to the indoor heat exchanger that circulates the refrigerant containing no oil and heat-exchanges the refrigerant of the first outdoor heat exchanger, a receiver, and a pump. A restriction of a length and a diameter of a connection pipe for connecting an outdoor unit and the indoor unit is decreased, and an oil shortage of the compressor is prevented.

23 Claims, 8 Drawing Sheets

SECOND-REFRIGERANT PUMP DRIVING TYPE AIR CONDITIONER

This application claims the benefit of Korean Application No. 10-2005-16281 and Korean Application No. 10-2005-16282, which were both filed on Feb. 26, 2005, and which are both hereby incorporated by reference in their entireties.

BACKGROUND OF THE INVENTION

1. Field of the Invention

The present invention relates to a second-refrigerant pump driving type air conditioner, and more particularly, to a second-refrigerant pump driving type air conditioner capable of performing a heating operation, reducing a restriction of a length and a diameter of a connection pipe for connecting an outdoor unit and an indoor unit, and preventing an oil shortage of a compressor.

2. Description of the Background Art

Generally, an air conditioner is provided with an indoor unit for heating or cooling an indoor room, and an outdoor unit for providing a compressed refrigerant to the indoor unit.

Figure 1:
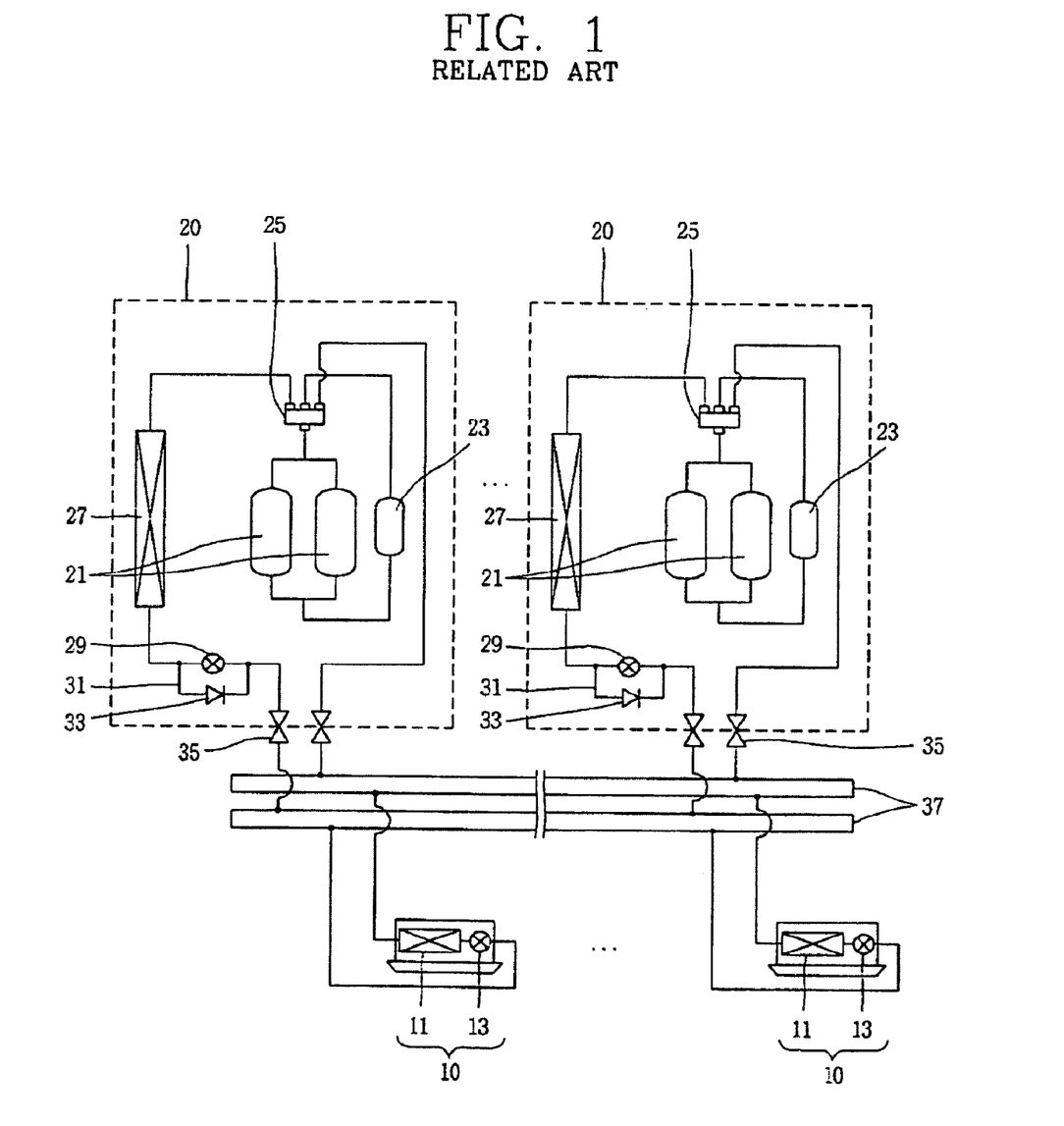
FIG. 1 is a construction view showing an air conditioner in accordance with the conventional art.

As shown in FIG. 1, the air conditioner comprises a plurality of indoor units 10, and a plurality of outdoor units 20 for providing a refrigerant according to a driving state of each indoor unit 10.

Each indoor unit 10 comprises an indoor heat exchanger 11 for heat-exchanging the refrigerant with indoor air, and an indoor side expander 13 disposed at an inlet of the indoor heat exchanger 11 for depressurizing and expanding the refrigerant.

Each outdoor unit 20 comprises a compressor 21, and an outdoor heat exchanger 27 connected to the compressor 21 for heat-exchanging the refrigerant with outdoor air. A common accumulator 23 for sucking a gaseous refrigerant into each compressor 21 is installed at an inlet of the compressor 21, and a four-way valve 25 for switching a refrigerant channel is installed at an outlet of the compressor 21. An outdoor expander 29 is installed at one side of the outdoor heat exchanger 27 along a flow direction of the refrigerant. Also, a bypass 31 having a check valve 33 is formed at one side of the outdoor expander 29. Each outdoor unit 20 is provided with service valves 35, and a connection pipe 37 for distributing or integrating the refrigerant is provided between each outdoor unit 20 and each indoor unit 10.

When the air conditioner is operated, the outdoor units 20 are selectively driven in correspondence with a load amount of the indoor unit 10 being driven among the plural indoor units 10. Each four-way valve 25 of the outdoor unit 20 being driven switches a refrigerant channel according to a driving mode of the indoor unit 10. When the indoor unit 10 is operated in a cooling mode, the four-way valve 25 of the outdoor unit 20 being driven switches a refrigerant channel so that the refrigerant discharged from the compressor 21 can pass through the outdoor heat exchanger 27. The refrigerant that has passed through the outdoor heat exchanger 27 passes through the indoor side expander 13 of the indoor unit 10 being driven, thereby being depressurized and expanded. The depressurized and expanded refrigerant is heat-exchanged with indoor air by the indoor heat exchanger 11, thereby performing a cooling operation. Then, the refrigerant is sucked into the compressor 21 via the four-way valve 25 and the accumulator 23 of the outdoor unit 20, thereby being compressed, discharged, and circulated, repeatedly.

Oil is filled in the compressor 21 with a refrigerant so as to cool and lubricate the compressor 21. Accordingly, oil is dispersed in the indoor unit 10 including the indoor heat exchanger 11 and in the connection pipe for connecting the indoor unit 10 and the outdoor unit 20 to each other.

In the conventional air conditioner, a pressure more than a certain degree has to be maintained in the connection pipe so that the oil remaining in the indoor heat exchanger 11 and the connection pipe can be smoothly recollected into the compressor 21. Therefore, there is a limitation in increasing a diameter of the connection pipe to a value more than a certain value, and a length of the connection pipe has to be maintained as a value less than a certain value. Accordingly, there is a distance limitation between the outdoor unit 20 and the indoor unit 10.

Furthermore, an oil recollecting driving for recollecting oil remaining in the indoor heat exchanger 11 and each connection pipe is periodically performed (for example, 6 to 8 hours). When the oil recollecting driving is performed, noise is generated and a cooling/heating operation is stopped thereby to cause a user's inconvenience.

BRIEF DESCRIPTION OF THE INVENTION

Therefore, an object of the present invention is to provide a second-refrigerant pump driving type air conditioner capable of reducing a restriction of a length and a diameter of a connection pipe for connecting an outdoor unit and an indoor unit and preventing an oil shortage of a compressor.

To achieve these and other advantages and in accordance with the purpose of the present invention, as embodied and broadly described herein, there is provided a second-refrigerant pump driving type air conditioner which includes an indoor unit having an indoor heat exchanger that heat-exchanges a refrigerant containing no oil with indoor air, a first circulator including a compressor that compresses and discharges a refrigerant containing oil, a first outdoor heat exchanger connected to a first side of the compressor that heat-exchanges the refrigerant discharged from the compressor with the refrigerant containing no oil, a second outdoor heat exchanger connected to a second side of the compressor that heat-exchanges the refrigerant discharged from the compressor with outdoor air, and an outdoor expander connected to the first outdoor heat exchanger and the second outdoor heat exchanger to depressurize and expand the refrigerant discharged from the compressor; and a second circulator including an intermediate heat exchanger connected to a first side of the indoor heat exchanger to heat-exchange the refrigerant containing no oil with the refrigerant inside the first outdoor heat exchanger, a receiver connected to a second side of the indoor heat exchanger that receives the refrigerant discharged from the indoor heat exchanger, and a pump that pumps the refrigerant received by the receiver so that it is circulated.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a second-refrigerant pump driving type air conditioner according to preferred embodiments of the present invention will be explained with reference to the attached drawings.

Figure 2:
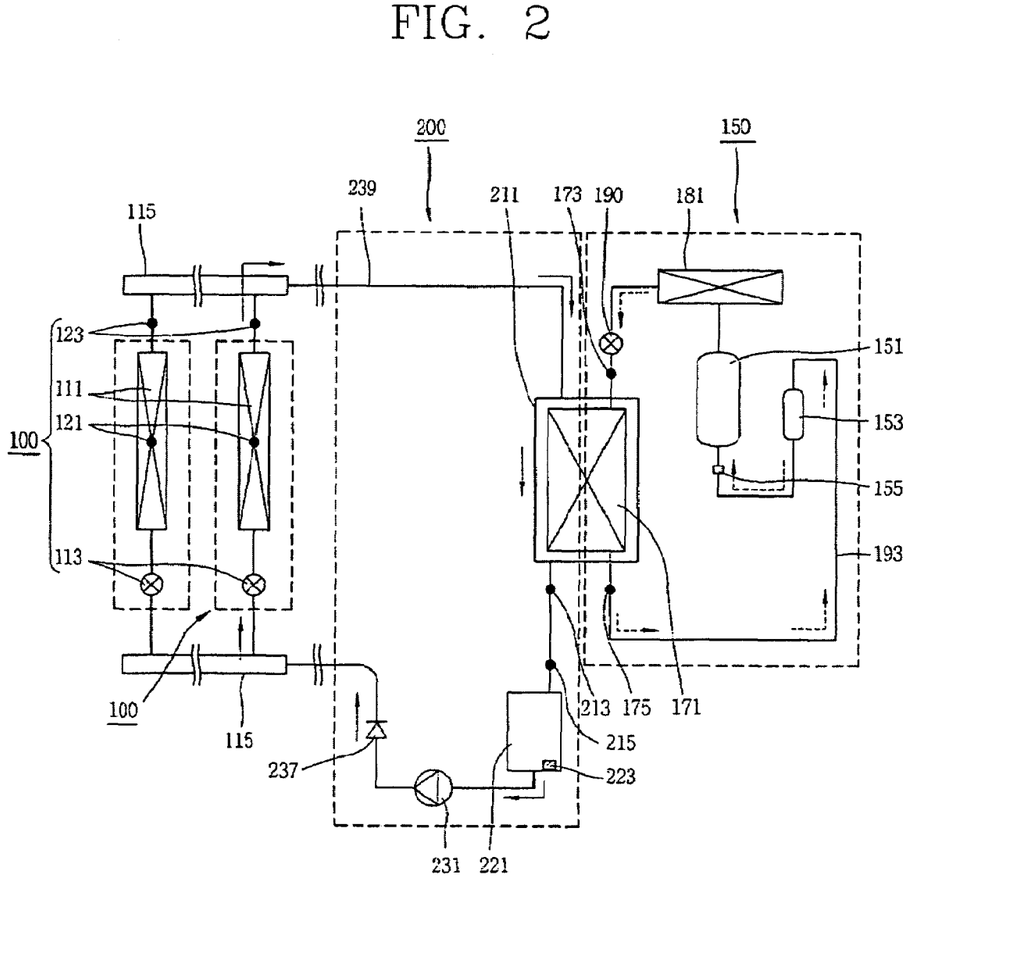
FIG. 2 is a construction view showing a second-refrigerant pump driving type air conditioner according to a first embodiment of the present invention.
Figure 3:
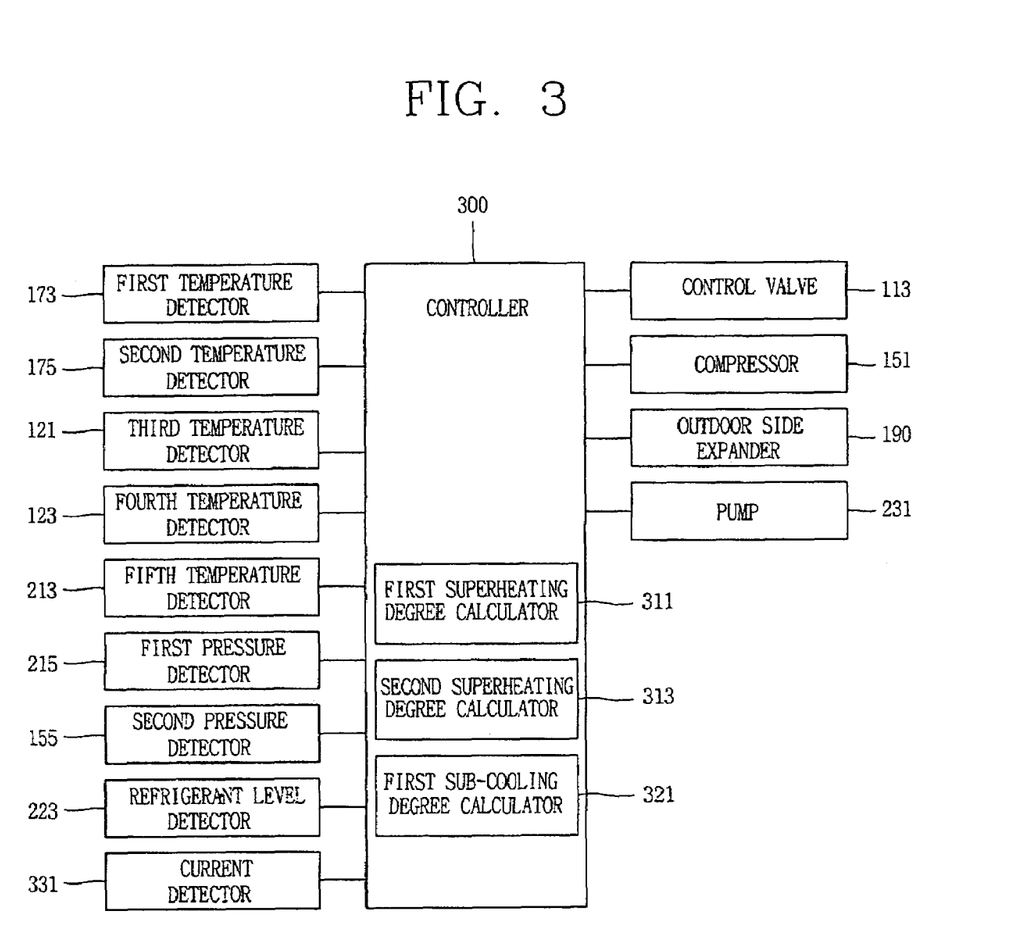
FIG. 3 is a control block diagram of FIG. 2.

FIG. 2 is a construction view showing a second-refrigerant pump driving type air conditioner according to a first embodiment of the present invention, and FIG. 3 is a control block diagram of FIG. 2.

Referring to FIGS. 2 and 3, the second-refrigerant pump driving type air conditioner includes an indoor unit 100 having an indoor heat exchanger 111 for heat-exchanging a refrigerant containing no oil with indoor air; a first circulator 150 including a compressor 151, a first outdoor heat exchanger 171 connected to one side of the compressor 151 for heat-exchanging the refrigerant discharged from the compressor 151 with the refrigerant that has passed through the indoor unit 100, a second outdoor heat exchanger 181 connected to another side of the compressor 151 for heat-exchanging the refrigerant therein with outdoor air, an outdoor side expander 190 being connected to the first outdoor heat exchanger 171 and the second outdoor heat exchanger 181 for depressurizing and expanding the refrigerant, and a first pipe 193 for circulating the refrigerant that has been compressed by the compressor 151; and a second circulator 200 including an intermediate heat exchanger 211 connected to one side of the indoor heat exchanger 111 for heat-exchanging the refrigerant therein with the refrigerant of the first outdoor heat exchanger 171, a receiver 221 connected to another side of the indoor heat exchanger 111 and temporarily receiving the refrigerant therein, a pump 231 connected to one side of the receiver 221 for pumping the liquid refrigerant inside the receiver and thus circulating the refrigerant, and a second pipe 239 for circulating the refrigerant that has pumped by the pump 231. Preferably, the first circulator 150 and the second circulator 200 are constructed as outdoor units arranged at an outdoor chamber. The first circulator 150 is constructed so that oil and a refrigerant each contained in the compressor 151 can be circulated along the first pipe 193 in order to cool and lubricate the compressor 151. The second circulator 200 is constructed so that a refrigerant containing no oil can be circulated along the second pipe 239.

Each indoor unit 100 includes an indoor heat exchanger 111 for heat-exchanging a refrigerant with indoor air, and a control valve 113 disposed at one side of the indoor heat exchanger 111 for controlling a flow amount of the refrigerant. A connection pipe 115 for connecting each indoor unit 100 is disposed at both sides of each indoor unit 100.

A third temperature detector 121 for detecting the refrigerant temperature is installed at a middle portion of each indoor heat exchanger 111. Also, a fourth temperature detector 123 for detecting the refrigerant temperature of an outlet side is respectively installed at an outlet of the indoor heat exchanger 111.

The first circulator 150 includes a compressor 151 for compressing a refrigerant, a first outdoor heat exchanger 171 connected to an inlet of the compressor 151 for heat-exchanging the refrigerant therein with the refrigerant that has passed through the indoor unit 100, a second outdoor heat exchanger 181 connected to an outlet of the compressor 151 for heat-exchanging a compressed refrigerant with outdoor air, an outdoor side expander 190 disposed between the first outdoor heat exchanger 171 and the second outdoor heat exchanger 181 for depressurizing and expanding the refrigerant, and a first pipe 193 for circulating the refrigerant.

An accumulator 153 for providing a gaseous refrigerant is connected to the inlet of the compressor 151, and a second pressure detector 155 for detecting an inlet pressure is disposed between the accumulator 153 and the compressor 151. Also, a first temperature detector 173 for detecting an inlet temperature of the first outdoor heat exchanger and a second temperature detector 175 for detecting an outlet temperature of the first outdoor heat exchanger are respectively provided at an inlet and an outlet of the first outdoor heat exchanger 171 according to a flow direction of the refrigerant at the time of a cooling operation.

The second circulator 200 includes an intermediate heat exchanger 211 for heat-exchanging the refrigerant that has passed through the indoor heat exchanger 111 with the refrigerant of the first outdoor heat exchanger 171, a receiver 221 for temporarily receiving the refrigerant that has passed through the intermediate heat exchanger 211, a pump 231 for pumping the refrigerant inside the receiver 221 to the indoor unit 100 being driven, and a second pipe 239 for circulating the refrigerant.

A fifth temperature detector 213 and a first pressure detector 215 for detecting an outlet temperature and an outlet pressure of the intermediate heat exchanger 211 are respectively installed at the outlet of the intermediate heat exchanger 211. A refrigerant level detector 223 for detecting a level of a liquid refrigerant inside the receiver 221 is provided at the receiver 221. A check valve 237 for preventing a refrigerant backflow is provided at an outlet of the pump 231.

A controller 300 is respectively connected to the compressor 151, the outdoor side expander 190, the pump 231, and the control valve 113 thus to control them according to a driving mode of the indoor unit 100, a load change, and the refrigerant state. The controller 300 is implemented as a microcomputer having a control program therein, and includes a first superheating degree calculator 311 for calculating a superheating degree of the first outdoor heat exchanger 171, a first sub-cooling degree calculator 321 for calculating a sub-cooling degree of the intermediate heat exchanger 211, and a second superheating degree calculator 313 for calculating a superheating degree of the indoor heat exchanger 111. A current detector 331 for detecting a change of an input current to the pump 231, the first pressure detector 215, the second pressure detector 155, the refrigerant level detector 223, and the first to fifth temperature detectors 173, 175, 121, 123, and 213 are electrically connected to the controller 300, respectively.

When a cooling operation of the indoor unit 100 is selected, the controller 300 controls the compressor 151 to be driven in correspondence with a load amount of the indoor unit 100 being driven. The refrigerant of the first circulator 150 that has been compressed by the compressor 151 thus to be discharged is circulated along the first pipe 193 as indicated by the dotted line arrow of FIG. 2. At the same time, the controller 300 drives the pump 231, and the refrigerant of the second circulator 200 that has been pumped by the pump 231 is circulated along the second pipe 239 as indicated by the solid line arrow of FIG. 2. The circulated refrigerant is heat-exchanged with indoor air at the indoor unit 100, thereby performing a cooling operation.

The controller 300 compares a desired low pressure value of an inlet of the compressor 151 with a pressure detected by the second pressure detector 155, and controls an rpm of the compressor 151 so that the inlet pressure of the compressor 151 can be the desired low pressure value.

The refrigerant compressed by the compressor 151 thus to be discharged is introduced into the first outdoor heat exchanger 171, and then is heat-exchanged with outdoor air thus to be condensed. The condensed refrigerant is depressurized and expanded via the outdoor side expander 190, and then is introduced into the first outdoor heat exchanger 171. Then, the refrigerant is heat-exchanged with the refrigerant that has passed through the indoor unit 100 in the first outdoor heat exchanger 171, and then is drawn into the compressor 151 via the accumulator 153 thus to be compressed and discharged, repeatedly.

The first temperature detector 173 and the second temperature detector 175 detect an inlet temperature and an outlet temperature of the first outdoor heat exchanger 171, respectively. The first superheating degree calculator 311 calculates a superheating degree of the first outdoor heat exchanger 171 based on the two detected temperatures. When the superheating degree detected by the first superheating degree calculator 311 is decreased, the controller 300 controls an opening degree of the outdoor side expander 190 to be decreased. On the contrary, when the superheating degree detected by the first superheating degree calculator 311 is increased, the controller 300 controls an opening degree of the outdoor side expander 190 to be increased.

When the pump 231 is driven, the liquid refrigerant inside the receiver 221 is discharged to the indoor unit 100 via the pump 231 and the check valve 237. When the pump 231 starts to be driven, the current detector 331 detects a change of an input current to the pump 231, and the refrigerant level detector 223 detects a level of the liquid refrigerant inside the receiver 221. The fifth temperature detector 213 and the first pressure detector 215 detect an outlet temperature and an outlet pressure of the intermediate heat exchanger 211, respectively. The first sub-cooling degree calculator 321 converts the detected outlet pressure into a temperature, and then calculates a difference between the converted temperature and a temperature detected by the fifth temperature detector 213, that is, an outlet sub-cooling degree of the intermediate heat exchanger 211.

When a variation amount of the input current to the pump 231 detected by the current detector 331 is more than a certain value for a certain time. the controller 300 decreases an rpm of the pump 231 thus to prevent a gaseous refrigerant from being introduced into the pump 231. When a level of the liquid refrigerant detected by the refrigerant level detector 223 is decreased to a preset level (a lower limit), the controller 300 controls an rpm (frequency) of the pump 231 not to be increased thus to prevent the gaseous refrigerant from being introduced into the pump 231. When an outlet sub-cooling degree of the intermediate heat exchanger 211 calculated by the first sub-cooling degree calculator 321 is increased, the controller 300 increases the rpm of the pump 231. On the contrary, when the outlet sub-cooling degree of the intermediate heat exchanger 211 calculated by the first sub-cooling degree calculator 321 is decreased, the controller 300 decreases the rpm of the pump 231.

The refrigerant that has flowed to the indoor unit 100 is introduced into the indoor heat exchanger 111 via the control valve 113, and then is heat-exchanged with indoor air thereby to perform a cooling operation. Herein, the third temperature detector 121 and the fourth temperature detector 123 detect a temperature of a middle portion of the indoor heat exchanger 111 and an outlet temperature of the indoor heat exchanger 111, respectively. The second superheating degree calculator 313 calculates a superheating degree of the indoor heat exchanger 111 based on the detected temperatures of the middle portion and the outlet of the indoor heat exchanger 111. When the calculated superheating degree of the indoor heat exchanger 111 detected by the second superheating degree calculator 313 is increased, the controller 300 controls an opening degree of the control valve 113 to be increased. On the contrary, when the calculated superheating degree is decreased, the controller 300 controls an opening degree of the control valve 113 to be decreased.

The refrigerant that has performed a cooling operation in the indoor unit 100 is introduced into the intermediate heat exchanger 211, and is heat-exchanged with the first outdoor heat exchanger 171 thus to be condensed. The condensed refrigerant is introduced into the receiver 221, and the liquid refrigerant inside the receiver 221 is pumped by the pump 231 thus to be discharged to the indoor unit 100, which is performed repeatedly.

When a condensation heat amount of the intermediate heat exchanger 211 is increased as a load of the indoor unit 100 is increased, a sub-cooling degree of the outlet of the intermediate heat exchanger 211 is decreased. When the condensation heat amount of the intermediate heat exchanger 211 is increased, an evaporation pressure of the first circulator 150 and an inlet pressure of the compressor 151 are increased. Herein, the controller 300 firstly controls the rpm of the compressor 151 prior to controlling the rpm of the pump 231, thereby preventing a lowering of a cooling capability due to a decrease of the rpm of the pump 231 of the second circulator 200.

On the contrary, when an outlet sub-cooling degree of the intermediate heat exchanger 211 is increased as a load of the indoor unit 100 is decreased, the controller 300 firstly controls the rpm of the pump 231 prior to controlling the rpm of the compressor 151.

When a compression capacity of the compressor 151 is varied for a safe control of the first circulator 150, the controller 300 firstly controls the rpm of the pump 231 prior to controlling the capacity variation of the compressor 151 in order to prevent a gaseous refrigerant from being introduced into the pump 231.

For example, in case of an oil-balancing operation between the compressors 151 for balancing oil inside a plurality of compressors 151 provided at the first circulator 150, that is, when the compressors 151 are to be alternately driven, the controller 300 firstly controls the rpm of the pump 231 in correspondence with each compression capacity of the compressors 151 to be alternately driven, and then operates the compressors 151 to be driven.

When the compressor 151 includes at least one inverter compressor and constant-speed type compressor and an rpm of the inverter compressor is decreased to a lowest frequency for a driving of the constant-speed type compressor, the controller 300 firstly controls the rpm of the pump 231 in correspondence with the lowest frequency of the inverter compressor and then drives the constant-speed type compressor.

Figure 4:
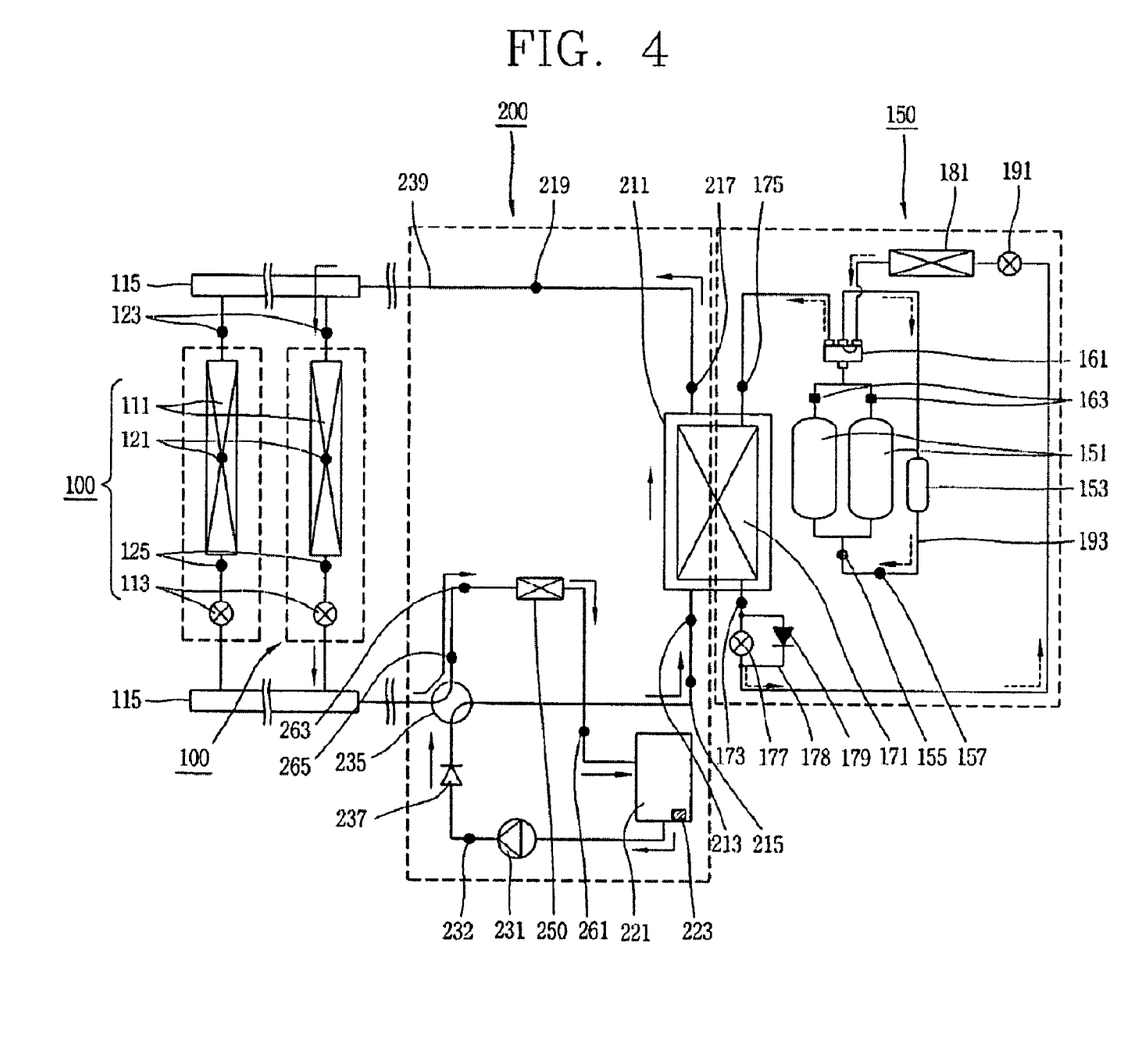
FIG. 4 is a construction view showing a second-refrigerant pump driving type air conditioner according to another embodiment of the present invention.
Figure 5:
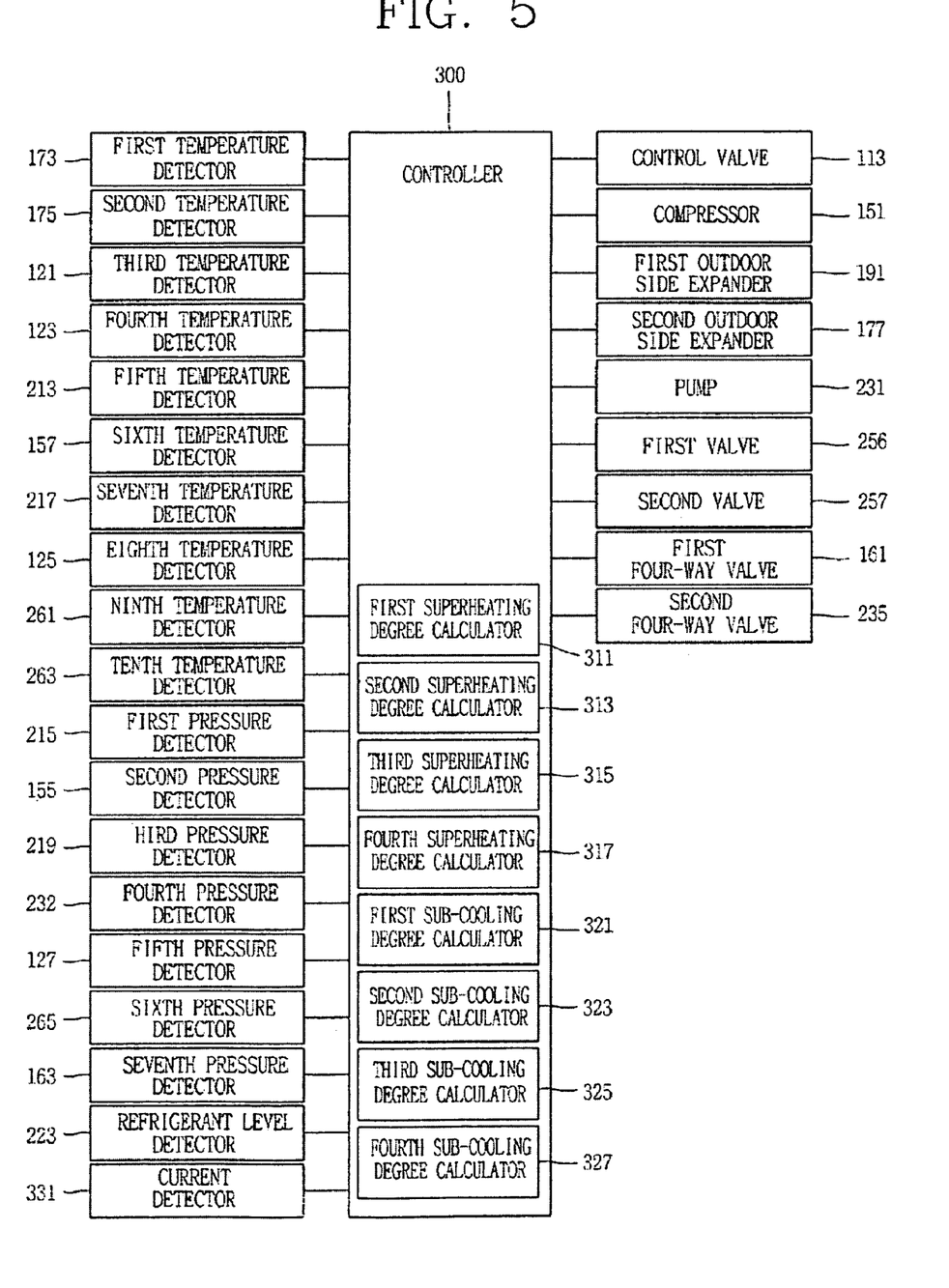
FIG. 5 is a control block diagram of FIG. 4.
Figure 6:
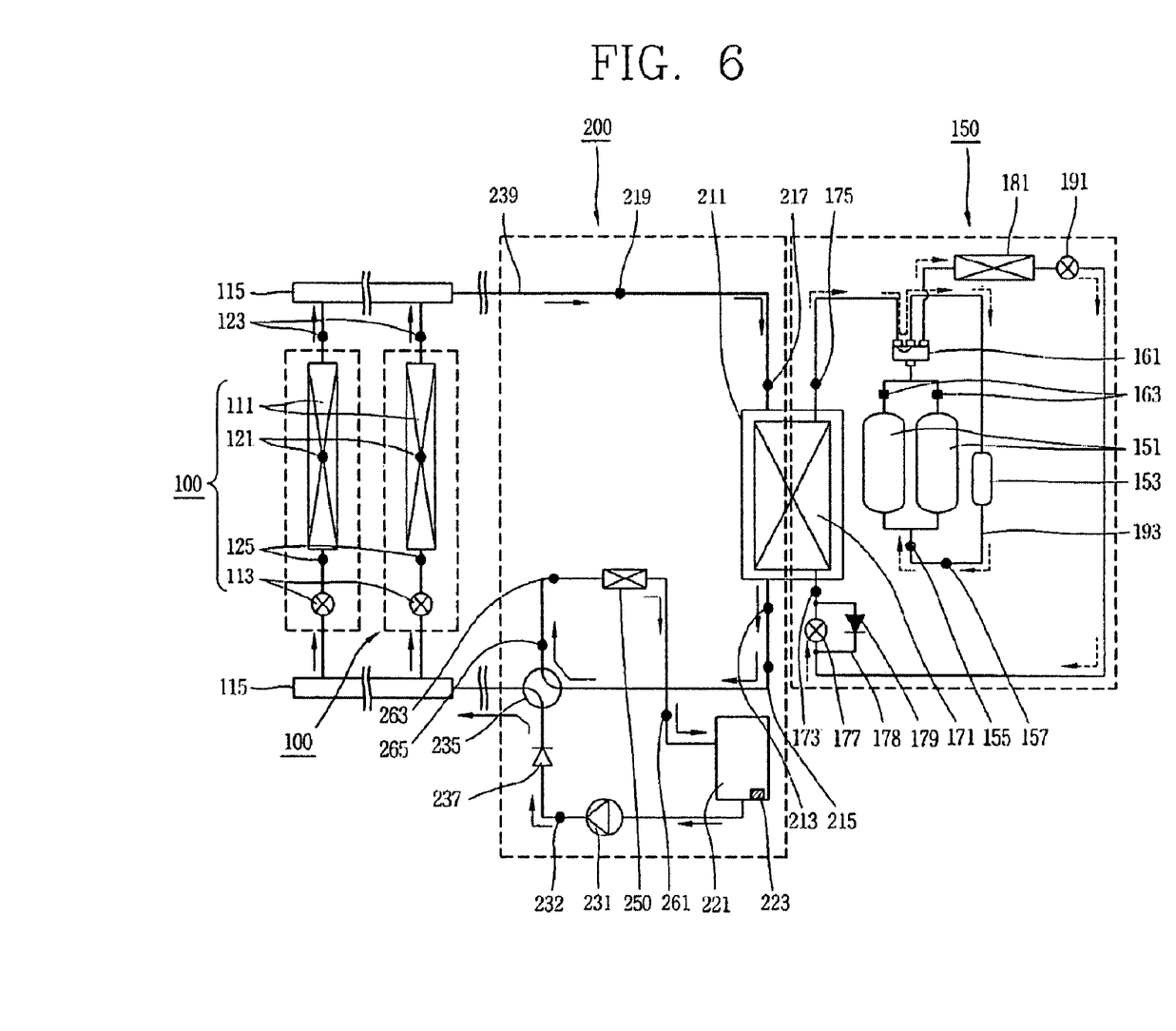
FIG. 6 is a view showing the refrigerant flow at the time of a cooling operation in FIG. 4.
Figure 7:
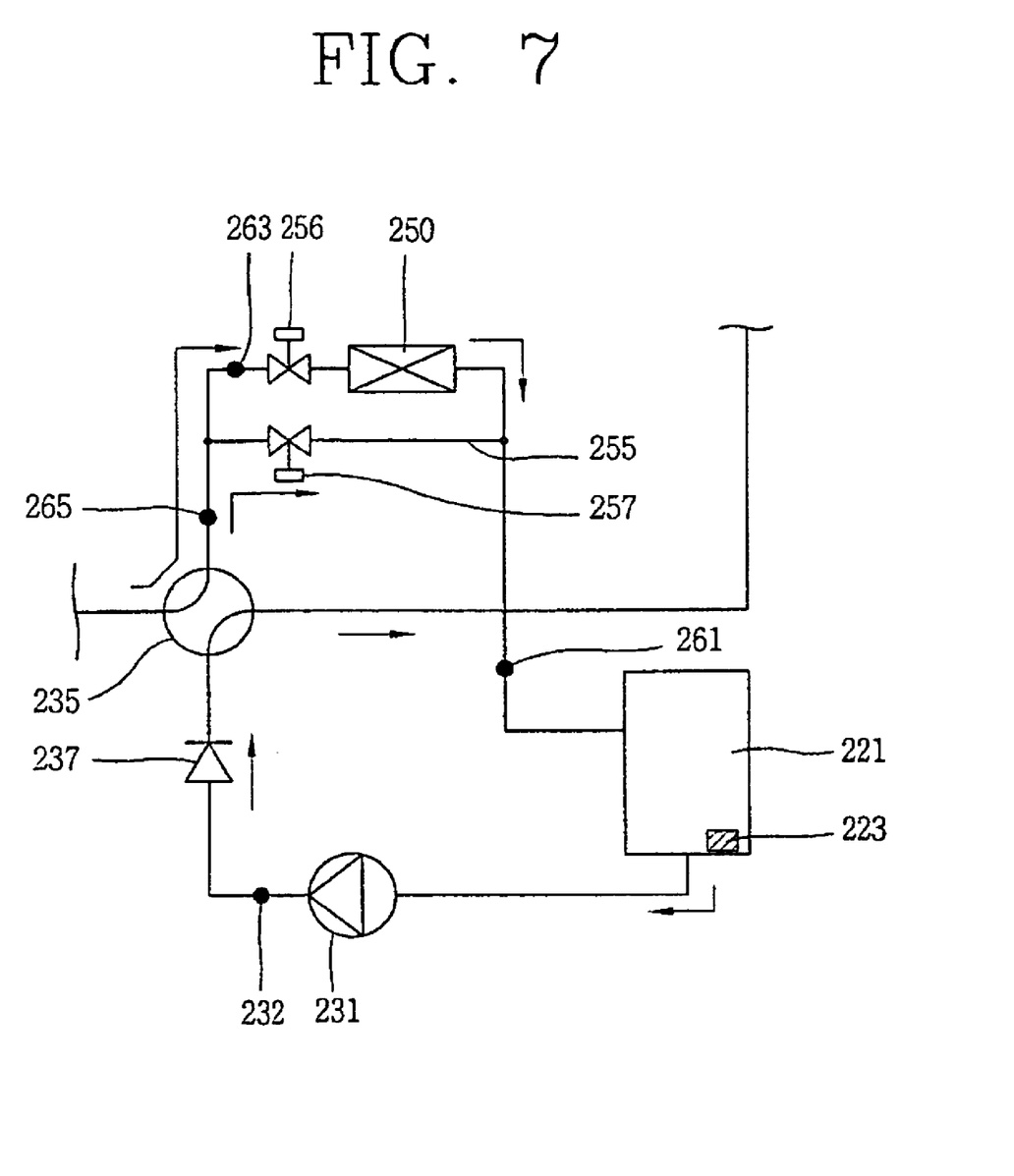
FIG. 7 is a view showing part of a second-refrigerant pump driving type air conditioner according to another embodiment of the present invention.
Figure 8:
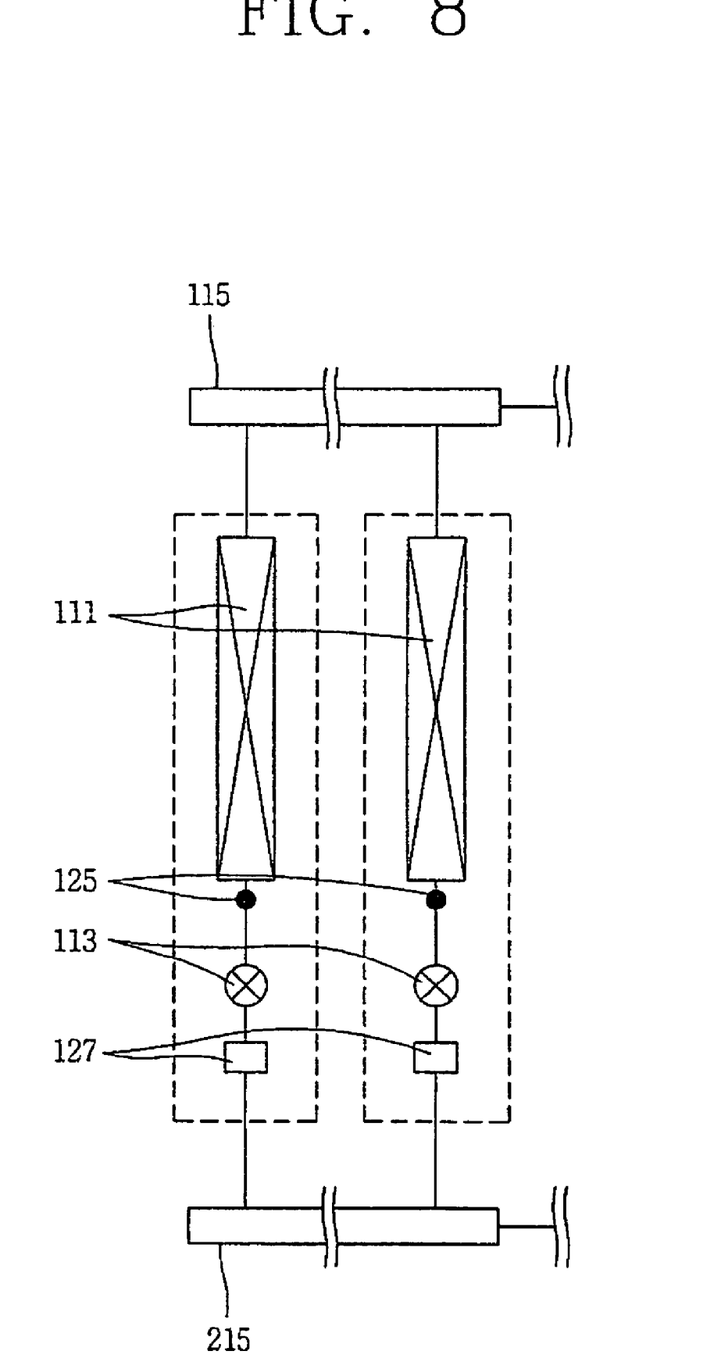
FIG. 8 is a view showing part of a second-refrigerant pump driving type air conditioner according to another embodiment of the present invention.

FIG. 4 is a construction view showing a second-refrigerant pump driving type air conditioner according to another embodiment of the present invention, FIG. 5 is a control block diagram of FIG. 4, FIG. 6 is a view showing a refrigerant flow at the time of a cooling operation in FIG. 4, and FIGS. 7 and 8 are views showing main parts of the second-refrigerant pump driving type air conditioner according to another embodiment of the present invention. The same reference numerals were given to the same parts as those of the aforementioned embodiment, and detail explanation thereof will be omitted.

Referring to FIGS. 4 and 5, the second-refrigerant pump driving type air conditioner comprises a plurality of indoor units 100 each having an indoor heat exchanger 111; a first circulator 150 including a plurality of compressors 151, a first outdoor heat exchanger 171 connected to one side of the compressor 151 for heat-exchanging a refrigerant therein with a refrigerant that has passed through the indoor unit 100, a second outdoor heat exchanger 181 connected to another side of the compressor 151 for heat-exchanging the refrigerant therein with outdoor air, a first outdoor side expander 191 disposed between the first outdoor heat exchanger 171 and the second outdoor heat exchanger 181 for depressurizing and expanding the refrigerant, and a first pipe 193 for circulating the refrigerant that has been compressed by the compressor 151; and a second circulator 200 including an intermediate heat exchanger 211 connected to one side of the indoor heat exchanger 111 for heat-exchanging a refrigerant therein with the refrigerant of the first outdoor heat exchanger 171, a receiver 221 connected to another side of the indoor heat exchanger 111 and temporarily receiving the refrigerant therein, a pump 231 for pumping the refrigerant inside the receiver 221 and thus circulating the refrigerant, and a second pipe 239 for circulating the refrigerant that has pumped by the pump 231.

Preferably, the first circulator 150 and the second circulator 200 are constructed as outdoor units arranged at an outdoor chamber. The first circulator 150 is constructed so that oil and a refrigerant each contained in the compressor 151 can be circulated along the first pipe 193 in order to cool and lubricate the compressor 151. The second circulator 200 is constructed so that a refrigerant containing no oil can be circulated along the second pipe 239.

Each indoor unit 100 includes an indoor heat exchanger 111 for heat-exchanging the refrigerant with indoor air, and a control valve 113 disposed at one side of the indoor heat exchanger 111 for controlling a flow amount of the refrigerant. A connection pipe 115 for connecting each indoor unit 100 is disposed at both sides of each indoor unit 100. A third temperature detector 121 for detecting the refrigerant temperature is installed at a middle portion of each indoor heat exchanger 111. Also, an eighth temperature detector 125 for detecting the refrigerant temperature of an outlet of the indoor heat exchanger 111 is respectively installed at an outlet of the indoor heat exchanger 111. A fourth temperature detector 123 for detecting an outlet temperature of each indoor heat exchanger 111 is respectively installed at an inlet of each indoor heat exchanger 111.

The first circulator 150 includes a plurality of compressors 151 for compressing the refrigerant, a first outdoor heat exchanger 171 connected to one side of the compressor 151 for heat-exchanging the refrigerant therein with the refrigerant that has passed through the indoor unit 100, a second outdoor heat exchanger 181 connected to another side of the compressor 151 for heat-exchanging the refrigerant therein with outdoor air, a first four-way valve 161 disposed at an outlet of the compressor 151 for switching a refrigerant channel, a first outdoor side expander 191 disposed between the first outdoor heat exchanger 171 and the second outdoor heat exchanger 181 for depressurizing and expanding the refrigerant, and a first pipe 193 for circulating the refrigerant. The compressor 151 includes at least one speed-variable type inverter compressor. Hereinafter, a compressor having an inverter compressor and a constant-speed type compressor will be explained.

A seventh pressure detector 163 for detecting a pressure and the first four-way valve 161 for switching a refrigerant channel are respectively installed at an outlet of the compressor 151. An accumulator 153 for providing a gaseous refrigerant, a sixth temperature detector 157 for detecting an inlet temperature, and a second pressure detector 155 for detecting an inlet pressure are respectively disposed at an inlet of the compressor 151. A second temperature detector 175 and a first temperature detector 173 for detecting an inlet temperature and an outlet temperature of the first outdoor heat exchanger 171 along a flow direction of the refrigerant at the time of a heating operation are respectively provided at an inlet and an outlet of the first outdoor heat exchanger 171. A second bypass channel 178 having a second outdoor side expander 177 for depressurizing and expanding the refrigerant and a check valve 179 is provided at an inlet of the first outdoor heat exchanger 171 along a flow direction of the refrigerant at the time of a cooling operation. Also, a first outdoor side expander 191 for depressurizing and expanding the refrigerant along a flow direction of the refrigerant at the time of a heating operation is provided at an inlet of the second outdoor heat exchanger 181.

The second circulator 200 includes an intermediate heat exchanger 211 connected to one side of the indoor heat exchanger 111 for heat-exchanging the refrigerant therein with the refrigerant of the first outdoor heat exchanger 171, a receiver 221 connected to another side of the indoor heat exchanger 111 and temporarily receiving the refrigerant therein, a pump 231 for pumping the liquid refrigerant inside the receiver 221 and thus discharging the refrigerant to the indoor unit 100 being driven, a second four-way valve 235 disposed at an outlet of the pump 231 for switching a refrigerant channel, a sub-cooler 250 disposed at an upper side of the receiver 221 for sub-cooling the refrigerant along a flow direction of the refrigerant at the time of a heating operation, and a second pipe 239 for circulating the refrigerant.

A seventh temperature detector 217 and a third pressure detector 219 for detecting an outlet temperature and an outlet pressure of the intermediate heat exchanger 211 along a flow direction of the refrigerant at the time of a heating operation are respectively installed at an outlet of the intermediate heat exchanger 211. Also, a fifth temperature detector 213 and a first pressure detector 215 for detecting an outlet temperature and an outlet pressure of the intermediate heat exchanger 211 along a flow direction of the refrigerant at the time of a cooling operation are respectively installed at an inlet of the intermediate heat exchanger 211.

A refrigerant level detector 223 for detecting a level of a liquid refrigerant inside the receiver 221 is provided at the receiver 221. A fourth pressure detector 232 for detecting a pressure is provided at an outlet of the pump 231. A check valve 237 for preventing a refrigerant backflow is provided between the pump 231 and the second four-way valve 235.

A ninth temperature detector 261 for detecting a refrigerant temperature along a flow direction of the refrigerant at the time of a heating operation is disposed at an outlet of the sub-cooler 250. Also, a tenth temperature detector 263 and a sixth pressure detector 265 for detecting the refrigerant temperature and the refrigerant pressure are respectively installed at an inlet of the sub-cooler 250. As shown in FIG. 7, a first bypass channel 255 for bypassing a sufficiently sub-cooled refrigerant that has passed through the second four-way valve 235 to the sub-cooler 250 is provided at one side of the sub-cooler 250. One end of the first bypass channel 255 is diverged between the sixth pressure detector 265 and the tenth temperature detector 263, and another end of the first bypass channel 255 is integrated between the sub-cooler 250 and the ninth temperature detector 261. A first valve 256 and a second valve 257 for selectively opening and closing each channel are respectively provided at an upper end of the sub-cooler 250 and an upper end of the first bypass channel 255.

A controller 300 is respectively connected to the compressor 151, the first outdoor side expander 191, the second outdoor side expander 177, the pump 231, and the control valve 113 thus to control them according to a driving mode of the indoor unit 100, a load change, and a refrigerant state. The controller 300 is implemented as a microcomputer having a control program therein. The controller 300 includes the first superheating degree calculator 311 for calculating a superheating degree of the first outdoor heat exchanger 171, the sub-cooling degree calculator 321 for calculating a sub-cooling degree of the intermediate heat exchanger 211, and the second superheating degree calculator 313 for calculating a superheating degree of the indoor heat exchanger 111, each unit is operated at the time of a cooling operation.

The controller 300 also includes the third superheating degree calculator 315 for calculating an inlet superheating degree of the compressor 151, the fourth superheating degree calculator 317 for calculating a superheating degree of the intermediate heat exchanger 211, the second sub-cooling degree calculator 323 for calculating a sub-cooling degree of the first outdoor heat exchanger 171, the third sub-cooling degree calculator 325 for calculating a sub-cooling degree of the indoor heat exchanger 111, and the fourth sub-cooling degree calculator 327 for calculating a sub-cooling degree of the sub-cooler 250, each unit is operated at the time of a heating operation.

A current detector 331 for detecting a change of an input current to the pump 231, the refrigerant level detector 223, and each pressure detector, and each temperature detector are electrically connected to the controller 300, respectively.

When a heating operation of the indoor unit 100 is selected, the controller 300 controls the compressor 151 and the first four-way valve 161 in correspondence with a load amount of the indoor unit 100 being driven so that the refrigerant of the first circulator 150 can be circulated along the first pipe 193 as indicated by the dotted line arrow of FIG. 4. At the same time, the controller 300 controls the pump 231 and the second four-way valve 235 so that the refrigerant of the second circulator 200 can be circulated along the second pipe 239 to perform a heating operation in the indoor unit 100 as indicated by the solid line arrow of FIG. 4.

The controller 300 compares a desired high pressure value of an outlet of the compressor 151 with a pressure detected by the seventh pressure detector 163, and controls an rpm of the compressor 151 so that the outlet pressure of the compressor 151 can be the desired high pressure value.

The refrigerant compressed by the compressor 151 thus to be discharged is introduced into the first outdoor heat exchanger 171 via the first four-way valve 161, and then is heat-exchanged with a refrigerant that has passed through the indoor heat exchanger 111 thus to be condensed. The condensed refrigerant flows along the second outdoor side expander 177 and the second bypass channel 178, and then is depressurized via the first outdoor side expander 191 thus to be introduced into the second outdoor heat exchanger 181. Then, the refrigerant is heat-exchanged with outdoor air in the second outdoor heat exchanger 181, and then is drawn into the compressor 151 via the accumulator 153 thus to be compressed and discharged, repeatedly.

The second superheating degree calculator 323 calculates a superheating degree of the first outdoor heat exchanger 171 based on result values detected by the second temperature detector 175 and the first temperature detector 173. The third superheating degree calculator 315 converts a pressure detected by the second pressure detector 155 into a saturated temperature, and then calculates a difference between the converted temperature and a temperature detected by the sixth temperature detector 157, that is, an inlet superheating degree of the compressor 151. When an outlet sub-cooling degree of the first outdoor heat exchanger 171 is more than a certain value and an inlet superheating degree of the compressor 151 is more than a certain value, the controller 300 controls an opening degree of the first outdoor side expander 191 to be increased. Accordingly, a circulation amount of the refrigerant of the first circulator 150 is increased.

When the pump 231 is driven, the liquid refrigerant inside the receiver 221 flows to the intermediate heat exchanger 211 via the pump 231, the check valve 237, and the second four-way valve 235. Then, the liquid refrigerant is heat-exchanged by the first outdoor heat exchanger 171. Herein, the current detector 331 detects a change of an input current to the pump 231, and the refrigerant level detector 223 detects a level of the liquid refrigerant inside the receiver 221. The fourth pressure detector 232 detects an outlet pressure of the pump 231, and the seventh temperature detector 217 and the third pressure detector 219 detect an outlet temperature and an outlet pressure of the intermediate heat exchanger 211, respectively. The fourth superheating degree calculator 317 converts the detected outlet pressure into a saturated temperature, and then calculates a difference between the converted temperature and a temperature detected by the seventh temperature detector 217, that is, an outlet superheating degree of the intermediate heat exchanger 211.

The controller 300 controls the rpm of the pump 231 so that the detected outlet pressure of the pump 231 can be greater than the outlet pressure of the intermediate heat exchanger 211. When a variation amount of the input current to the pump 231 detected by the current detector 331 is more than a certain value for a certain time, the controller 300 decreases an rpm of the pump 231 thus to prevent a gaseous refrigerant from being introduced into the pump 231. When a level of the liquid refrigerant detected by the refrigerant level detector 223 is decreased to a preset level (a lower limit), the controller 300 controls an rpm (frequency) of the pump 231 not to be increased thus to prevent the gaseous refrigerant from being introduced into the pump 231. When an outlet superheating degree of the intermediate heat exchanger 211 calculated by the fourth superheating degree calculator 317 is increased, the controller 300 increases the rpm of the pump 231. On the contrary, when the outlet superheating degree of the intermediate heat exchanger 211 calculated by the fourth superheating degree calculator 317 is decreased, the controller 300 decreases the rpm of the pump 231.

The refrigerant that has been heat-exchanged with the refrigerant of the first outdoor heat exchanger 171 by the intermediate heat exchanger 211 flows to the indoor unit 100 being driven, and is heat-exchanged with indoor air at the indoor heat exchanger 111, thereby performing a heating operation. Then, the refrigerant is introduced into the sub-cooler 250 via the control valve 113 and the second four-way valve 235. Herein, the third temperature detector 121 and the eighth temperature detector 125 detect a temperature of a middle portion of the indoor heat exchanger 111 and an outlet temperature of the indoor heat exchanger 111, respectively. The third sub-cooling degree calculator 325 calculates a sub-cooling degree of the indoor heat exchanger 111 based on the detected temperatures of the middle portion and the outlet of the indoor heat exchanger 111. As shown in FIG. 8, when a fifth pressure detector 127 for detecting an outlet pressure of the indoor heat exchanger 111 is provided, the controller 300 converts a pressure detected by the fifth pressure detector 127 into a saturated temperature. Then, the controller 300 calculates a difference between the converted temperature and an outlet temperature of the indoor heat exchanger 111 detected by the eighth temperature detector 125, that is, an outlet sub-cooling degree of the indoor heat exchanger 111, thereby controlling the control valve 113.

When the calculated sub-cooling degree of the indoor heat exchanger 111 detected by the third sub-cooling degree calculator 325 is increased, the controller 300 controls an opening degree of the control valve 113 to be increased. On the contrary, when the calculated sub-cooling degree is decreased, the controller 300 controls an opening degree of the control valve 113 to be decreased. When a sub-cooling degree of the indoor heat exchanger 111 of the stationary indoor unit 100 calculated by the third sub-cooling degree calculator 325 is more than a preset value, the controller 300 can perform a liquid refrigerant recollecting operation for recollecting a liquid refrigerant condensed in the corresponding indoor heat exchanger 111 by opening the corresponding control valve 113.

The refrigerant that has been introduced into the sub-cooler 250 is radiated from the sub-cooler 250 thus to be condensed. Then, the refrigerant is introduced into the receiver 221 and then is discharged to the indoor unit 100 by the pump 231, which is repeated. Herein, the tenth temperature detector 263 and the sixth pressure detector 265 detect an inlet temperature and an inlet pressure of the sub-cooler 250, respectively. Also, the ninth temperature detector 261 detects an outlet temperature of the sub-cooler 250. The fourth sub-cooling degree calculator 327 converts the inlet pressure of the sub-cooler 250 into a saturated temperature, and calculates an inlet sub-cooling degree of the sub-cooler 250 based on a difference between the converted temperature and the detected inlet temperature of the sub-cooler 250. Also, the fourth sub-cooling degree calculator 327 calculates an outlet sub-cooling degree of the sub-cooler 250 based on a difference between the converted temperature and the detected outlet temperature of the sub-cooler 250. When the inlet sub-cooling degree of the sub-cooler 250 is less than a preset value, the controller 300 controls a sub-cooling amount of the sub-cooler 250 so that the outlet sub-cooling degree of the sub-cooler 250 can be more than a preset value. As shown in FIG. 7, when the inlet sub-cooling degree of the sub-cooler 250 is more than a preset value, the controller 300 respectively controls the first valve 256 and the second valve 257 so that the refrigerant can flow along the first bypass channel 255.

When an evaporation amount of the intermediate heat exchanger 211 is increased as a load of the indoor unit 100 is increased, an outlet super-heating degree of the intermediate heat exchanger 211 is decreased. When the evaporation amount of the intermediate heat exchanger 211 is increased, a condensation pressure of the first outdoor heat exchanger 171 of the first circulator 151 is lowered and a discharge pressure of the compressor 151 is lowered. Herein, the controller 300 firstly controls the rpm of the compressor 151, then the rpm of the pump 231.

When a sub-cooling degree of the indoor heat exchanger 111 is decreased as a load of the indoor unit 100 is decreased, the controller 300 lowers the rpm of the pump 231 thereby to prevent a gaseous refrigerant from being introduced into the pump 231.

When a compression capacity of the compressor 151 is varied for a safe control of the first circulator 150, the controller 300 firstly controls the rpm of the pump 231 prior to controlling the capacity variation of the compressor 151 in order to prevent a gaseous refrigerant from being introduced into the pump 231.

For example, in the case of an oil-balancing operation between a plurality of the compressors 151, the controller 300 firstly controls the rpm of the pump 231 in correspondence with each compression capacity of the compressors 151 to be alternately driven, and then operates the compressors 151 to be driven.

When the compressor 151 includes at least one inverter compressor and constant-speed type compressor and an rpm of the inverter compressor is decreased to a lowest frequency for a driving of the constant-speed type compressor, the controller 300 firstly controls the rpm of the pump 231 in correspondence with the lowest frequency of the inverter compressor and then drives the constant-speed type compressor.

When a cooling operation of the indoor unit 100 is implemented, the controller 300 controls the first four-way valve 161 so that the refrigerant discharged from the compressor 151 can be introduced into the second outdoor heat exchanger 181, and at the same time, controls the second four-way valve 235 so that the pumped refrigerant can be introduced into the intermediate heat exchanger 211. A control for the cooling operation is similar to the control aforementioned in FIGS. 2 and 3. Therefore, detailed explanation for controlling the cooling operation will be omitted and each refrigerant flow by the first circulator 150 and the second circulator 200 will be explained.

The refrigerant compressed by the compressor 151 thus to be discharged is introduced into the second outdoor heat exchanger 181 thus to be condensed, and then is depressurized and expanded via the second outdoor side expander 177. The depressurized refrigerant absorbs peripheral latent heat in the first outdoor heat exchanger 171 thus to be evaporated, and then is introduced into the accumulator 153 via the first four-way valve 161. Then, the gaseous refrigerant inside the accumulator 153 is drawn into the compressor 151 thus to be compressed and discharged, which is repeatedly performed.

The refrigerant that has been pumped by the pump 231 is introduced into the indoor heat exchanger 111 of the indoor unit 100 being driven via the second four-way valve 235, and is heat-exchanged with indoor air, thereby performing a cooling operation. Then, the refrigerant that has performed the cooling operation is introduced into the intermediate heat exchanger 211, and is heat-exchanged with the refrigerant of the first outdoor heat exchanger 171 by the intermediate heat exchanger 211 thus to have a lowered temperature. The refrigerant that has passed through the intermediate heat exchanger 211 is introduced into the receiver 221 via the second-four-way valve 235 and the sub-cooler 250, and is circulated along the second pipe 239 by the pump 231, thereby performing a cooling operation.

As aforementioned, in the second-refrigerant pump driving type air conditioner according to the present invention, a restriction on a length and a diameter of the connection pipe for connecting the outdoor unit to the indoor unit is decreased thus to decrease a restriction on an installation distance between the outdoor unit and the indoor unit. Furthermore, a circulation path of a refrigerant containing oil is shortened thereby to prevent an oil shortage of the compressor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A second-refrigerant pump driving type air conditioner, comprising:
   an indoor unit having an indoor heat exchanger that heat-exchanges a refrigerant containing no oil with indoor air;
   a first circulator including a compressor that compresses and discharges a refrigerant containing oil, a first outdoor heat exchanger connected to a first side of the compressor that heat-exchanges the refrigerant discharged from the compressor with the refrigerant containing no oil, a second outdoor heat exchanger connected to a second side of the compressor that heat-exchanges the refrigerant discharged from the compressor with outdoor air, and an outdoor expander connected to the first outdoor heat exchanger and the second outdoor heat exchanger to depressurize and expand the refrigerant discharged from the compressor; and
   a second circulator including an intermediate heat exchanger connected to a first side of the indoor heat exchanger to heat-exchange the refrigerant containing no oil with the refrigerant inside the first outdoor heat exchanger, a receiver connected to a second side of the indoor heat exchanger that receives the refrigerant discharged from the indoor heat exchanger, and a pump that pumps the refrigerant received by the receiver so that it is circulated.

2. The air conditioner according to claim 1, further comprising a controller that controls the revolutions per minute (rpm) of the pump to reduce an amount of gaseous refrigerant introduced into the pump.

3. The air conditioner according to claim 2, further comprising a refrigerant level detector that detects a level of liquid refrigerant inside the receiver, wherein the controller controls an amount of refrigerant discharged by the pump based on a value provided by the refrigerant level detector.

4. The air conditioner according to claim 2, further comprising a current detector that detects an input current to the pump, wherein the controller controls an amount of refrigerant discharged by the pump based on a value provided by the current detector.

5. The air conditioner according to claim 2, further comprising:
   a first temperature detector and a second temperature detector that detect the temperature of inlet refrigerant and outlet refrigerant of the first outdoor heat exchanger; and
   a first superheating degree calculator that calculates an outlet superheating degree of the first outdoor heat exchanger based on values provided by the first temperature detector and the second temperature detector, wherein the first outdoor heat exchanger is connected to an inlet of the compressor, the second outdoor heat exchanger is connected to an outlet of the compressor, and the controller controls an opening degree of the outdoor expander based on a value provided by the first superheating degree calculator.

6. The air conditioner according to claim 5, further comprising:
   a control valve disposed at one side of the indoor heat exchanger that controls a flow amount of a refrigerant;
   a third temperature detector that detects a refrigerant temperature at a central portion of the indoor heat exchanger;
   a fourth temperature detector that detects the temperature of outlet refrigerant of the indoor heat exchanger; and
   a second superheating degree calculator that calculates an outlet superheating degree of the indoor heat exchanger, wherein the controller controls an opening degree of the control valve based on a value provided by the second superheating degree calculator.

7. The air conditioner according to claim 6, further comprising:
   a fifth temperature detector that detects a temperature of outlet refrigerant of the intermediate heat exchanger;
   a first pressure detector that detects a pressure of the outlet refrigerant of the intermediate heat exchanger; and
   a first sub-cooling degree calculator that calculates an outlet sub-cooling degree of the intermediate heat exchanger based on values provided by the fifth temperature detector and the first pressure detector, wherein the controller controls an amount of refrigerant discharged by the pump based on a value provided by the first sub-cooling degree calculator.

8. The air conditioner according to claim 7, wherein when an outlet sub-cooling degree of the intermediate heat exchanger is varied based on a load change of the indoor unit, the controller controls a compression capacity of the compressor and then controls an amount of refrigerant discharged by the pump.

9. The air conditioner according to claim 2, further comprising:
   a first temperature detector and a second temperature detector that detect the temperature of inlet refrigerant and outlet refrigerant of the first outdoor heat exchanger;
   a sub-cooling degree calculator that calculates an outlet sub-cooling degree of the first outdoor heat exchanger based on values provided by the first temperature detector and the second temperature detector,
   a third temperature detector and a pressure detector that detect a temperature and a pressure of inlet refrigerant of the compressor; and
   a superheating degree calculator that calculates an inlet superheating degree of the compressor based on values provided by the third temperature detector and the pressure detector, wherein the first outdoor heat exchanger is connected to an outlet of the compressor, the second outdoor heat exchanger is connected to an inlet of the compressor, and when an outlet sub-cooling degree of the first outdoor heat exchanger is greater than a predetermined value and an inlet superheating degree of the compressor is greater than a predetermined value, the controller increases an opening degree of the outdoor side expander.

10. The air conditioner according to claim 2, further comprising:
    a pressure detector that detects a pressure of outlet refrigerant of the intermediate heat exchanger;

a temperature detector that detects a temperature of outlet refrigerant of the intermediate heat exchanger; and a superheating degree calculator that calculates an outlet superheating degree of the intermediate heat exchanger based on the pressure and the temperature of the outlet refrigerant of the intermediate heat exchanger, wherein the first outdoor heat exchanger is connected to an outlet of the compressor, the second outdoor heat exchanger is connected to an inlet of the compressor, and the controller controls an rpm of the pump so that the outlet superheating degree of the intermediate heat exchanger is set to a desired superheating degree.

11. The air conditioner according to claim 2, further comprising:

a pressure detector that detects a pressure of outlet refrigerant of the intermediate heat exchanger; and a pressure detector that detects a pressure of outlet refrigerant of the pump, wherein the first outdoor heat exchanger is connected to an outlet of the compressor, the second outdoor heat exchanger is connected to an inlet of the compressor, and the controller controls an rpm of the pump so that the pressure of the outlet refrigerant of the pump is lower than the pressure of the outlet refrigerant of the intermediate heat exchanger.

12. The air conditioner according to claim 2, further comprising:

a control valve disposed at one side of the indoor heat exchanger that controls a flow amount of a refrigerant; and a sub-cooling degree calculator that calculates an outlet sub-cooling degree of the indoor heat exchanger, wherein the first outdoor heat exchanger is connected to an outlet of the compressor, the second outdoor heat exchanger is connected to an inlet of the compressor, and the controller controls the control valve so that the sub-cooling degree of the indoor heat exchanger is set to a desired sub-cooling degree.

13. The air conditioner according to claim 12, further comprising:

a temperature detector that detects a temperature of a refrigerant at a central portion of the indoor heat exchanger; and a temperature detector that detects a temperature of outlet refrigerant of the indoor heat exchanger, wherein the sub-cooling degree calculator calculates an outlet sub-cooling degree of the indoor heat exchanger based on the temperature of the refrigerant at the central portion of the indoor heat exchanger and the temperature of the outlet refrigerant of the indoor heat exchanger.

14. The air conditioner of claim 12, further comprising:

a temperature detector that detects a temperature of outlet refrigerant of the indoor heat exchanger; and a pressure detector that detects a pressure of outlet refrigerant of the intermediate heat exchanger, wherein the sub-cooling degree calculator calculates an outlet sub-cooling degree of the indoor heat exchanger based on the pressure of the outlet refrigerant of the intermediate heat exchanger and the temperature of the outlet refrigerant of the indoor heat exchanger.

15. The air conditioner according to claim 14, wherein when a sub-cooling degree of the indoor heat exchanger of the indoor unit calculated by the sub-cooling degree calculator is greater than a preset value, the controller recollects a liquid refrigerant inside the indoor heat exchanger of the indoor unit by opening the control valve.

16. The air conditioner according to claim 2, further comprising:

a first four-way valve connected to an outlet of the compressor that switches a refrigerant channel of the first circulator; and a second four-way valve connected to an outlet of the pump that switches a refrigerant channel of the second circulator, wherein the controller controls the first four-way valve and the second four-way valve so that each refrigerant channel is switched according to a driving mode of the indoor unit.

17. The air conditioner according to claim 2, further comprising a sub-cooler connected to a side of the indoor heat exchanger that sub-cools refrigerant that passes through the indoor heat exchanger, wherein the controller controls the sub-cooler to reduce an amount of gaseous refrigerant introduced into the pump.

18. The air conditioner according to claim 17, further comprising:

a pressure detector that detects a pressure of inlet refrigerant of the sub-cooler;

a first temperature detector that detects a temperature of outlet refrigerant of the sub-cooler; and a sub-cooling degree calculator that calculates an outlet sub-cooling degree of the sub-cooler based on values provided by the pressure detector and the temperature detector.

19. The air conditioner according to claim 18, further comprising a second temperature detector that detects a temperature of inlet refrigerant of the sub-cooler, wherein the sub-cooling degree calculator calculates an inlet sub-cooling degree of the sub-cooler based on values provided by the pressure detector and the second temperature detector, and when the inlet sub-cooling degree of the sub-cooler is less than a preset value, the controller controls the sub-cooler so that the outlet sub-cooling degree of the sub-cooler becomes greater than a preset value.

20. The air conditioner according to claim 19, further comprising a first bypass channel having a first side connected to an inlet of the sub-cooler and a second side connected to an outlet of the sub-cooler.

21. The air conditioner according to claim 20, further comprising:

a first valve disposed at an inlet of the sub-cooler that opens and closes the inlet of the sub-cooler; and a second valve that opens and closes the first bypass channel, wherein when the inlet sub-cooling degree of the sub-cooler is greater than a preset value, the controller controls the first valve and the second valve so that the refrigerant bypasses the sub-cooler.

22. A second-refrigerant pump driving type air conditioner, comprising:

an indoor unit having an indoor heat exchanger that heat-exchanges a refrigerant containing no oil with indoor air;

a first circulator including at least one compressor that compresses and discharges a refrigerant containing oil, a first outdoor heat exchanger connected to a first side of the at least one compressor that heat-exchanges the refrigerant discharged from the at least one compressor with the refrigerant containing no oil, a second outdoor heat exchanger connected to a second side of the at least one compressor that heat-exchanges the refrigerant discharged from the at least one compressor with outdoor air, and an outdoor expander connected to the first outdoor heat exchanger and the second outdoor heat exchanger to depressurize and expand the refrigerant;

a second circulator including an intermediate heat exchanger connected to a first side of the indoor heat exchanger to heat-exchange the refrigerant containing no oil with the refrigerant inside the first outdoor heat exchanger, a receiver connected to a second side of the indoor heat exchanger that receives the refrigerant discharged from the indoor heat exchanger, and a pump that pumps the refrigerant received by the receiver so that it is circulated;

a sub-cooler connected to a side of the indoor heat exchanger that sub-cools the refrigerant that passes through the indoor heat exchanger; and a controller that controls the sub-cooler to reduce an amount of gaseous refrigerant introduced into the pump, controls revolutions per minute (rpm) of the pump in accordance with a capacity of a compressor to be driven during an oil-balancing operation, and drives the compressor to be driven during the oil-balancing operation.

23. A second-refrigerant pump driving type air conditioner, comprising:

an indoor unit having an indoor heat exchanger that heat-exchanges a refrigerant containing no oil with indoor air;

a first circulator including at least one inverter compressor and one constant-speed type compressor that compress and discharge a refrigerant containing oil, a first outdoor heat exchanger connected to a first side of the at least one compressor that heat-exchanges the refrigerant discharged from the at least one compressor with the refrigerant, a second outdoor heat exchanger connected to a second side of the at least one compressor that heat-exchanges the refrigerant discharged from the compressor with outdoor air, and an outdoor expander being connected to the first outdoor heat exchanger and the second outdoor heat exchanger to depressurize and expand the refrigerant;

a second circulator including an intermediate heat exchanger connected to a first side of the indoor heat exchanger to heat-exchange the refrigerant containing no oil with the refrigerant inside the first outdoor heat exchanger, a receiver connected to a second side of the indoor heat exchanger that receives the refrigerant discharged from the indoor heat exchanger, and a pump that pumps the refrigerant received by the receiver so that it is circulated;

a sub-cooler connected to a side of the indoor heat exchanger that sub-cools the refrigerant that passes through the indoor heat exchanger; and a controller that controls the sub-cooler to reduce an amount of gaseous refrigerant introduced into the pump, controls revolutions per minute (rpm) of the pump in accordance with a lowest frequency of the inverter compressor, and then controls the inverter compressor to have a lowest frequency for driving the constant-speed type compressor.

* * * * *